United States Patent
Hirata et al.

(10) Patent No.: US 7,909,472 B2
(45) Date of Patent: *Mar. 22, 2011

(54) PROJECTION-TYPE IMAGE DISPLAY APPARATUS

(75) Inventors: Koji Hirata, Yokohama (JP); Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,687

(22) Filed: Feb. 12, 2010

(65) Prior Publication Data

US 2010/0141907 A1 Jun. 10, 2010

Related U.S. Application Data

(63) Continuation of application No. 12/367,560, filed on Feb. 9, 2009, now Pat. No. 7,670,009.

(30) Foreign Application Priority Data

Mar. 10, 2008 (JP) ................................ 2008-059433

(51) Int. Cl.
*G03B 21/14* (2006.01)
(52) U.S. Cl. ................. 353/79; 353/70; 353/98; 353/46
(58) Field of Classification Search .................... 353/46, 353/50, 70, 69, 79, 98, 122; 349/5, 7
See application file for complete search history.

(56) References Cited

U.S. PATENT DOCUMENTS

| 7,413,312 | B2 * | 8/2008 | Engle et al. | 353/79 |
| 7,670,009 | B2 * | 3/2010 | Hirata et al. | 353/79 |
| 2008/0074623 | A1 * | 3/2008 | Odagiri et al. | 353/79 |
| 2008/0137040 | A1 * | 6/2008 | Rodriguez et al. | 353/79 |
| 2009/0015798 | A1 * | 1/2009 | Unsworth | 353/79 |

FOREIGN PATENT DOCUMENTS

| JP | 04-027912 | 1/1992 |
| JP | 2006-154720 | 6/2006 |

* cited by examiner

*Primary Examiner* — William C Dowling
(74) *Attorney, Agent, or Firm* — Antonelli, Terry, Stout & Kraus, LLP.

(57) ABSTRACT

A projection-type image display apparatus includes an image display element, a light source unit, an enlarging projection optical unit, and a display controller portion. The enlarging projection optical unit, includes a projection lens, a group of lenses which are disposed on a same optical axis, sequentially arranged from a side of the image display element and which include at least one lens having a lens surface, and a reflection mirror having a reflection surface which is disposed between the group of lenses and a display portion. The image display element has a display surface larger than a display surface of the display portion, when an entirety of the image display element is enlargedly projected on the display portion through the enlarging projection optical unit; and the display controller portion enables movement of the image on the display surface of the image display element.

7 Claims, 7 Drawing Sheets

PROJECTION-TYPE IMAGE DISPLAY APPARATUS

CROSS REFERENCE TO RELATED APPLICATION

This application is a continuation of U.S. application Ser. No. 12/367,560, filed Feb. 9, 2009, now U.S. Pat. No. 7,670,009, the contents of which are incorporated herein by reference.

BACKGROUND OF THE INVENTION

The present invention relates to a projection-type image display apparatus for projecting an image on a screen with using an image display element, such as, a liquid crystal panel, etc., and in particular, it relates to a technology of improving an installation (i.e., a degree of freedom of installation) of that apparatus.

Various kinds of projection-type image display apparatuses are already known and are applied into various fields of applications, widely, for projecting modulated lights, which are obtained by irradiating lights from a light source upon an image display element, on a display portion, such as, a screen or the like, for example, through so-called an enlarging projection optic system, including a projection lens, etc., while displaying an image on that image display element, such as, a transmission-type liquid crystal panel, etc.

Such projection-type image display apparatuses are used, in general, under the condition that the apparatus is installed in the vicinity of the screen or the like. For that reason, to such image display apparatuses, it is requested to shorten that projection distance, while obtaining an enlarged image having a sufficient largeness on the screen at the same time. One of means for achieving this is a wide-angle of the projection lens, and as other means, there are already known an oblique projection method of using a projection lens, having a structure for projecting the image, enlargedly, in a direction inclined to the screen. However, in particular, the oblique projection method of the latter is already disclosed in the following Patent Documents 1 and 2, which will be mentioned below.

[Patent Document 1] Japanese Patent Laying-Open No. Hei 4-27912 (1992); and

[Patent Document 2] Japanese Patent Laying-Open No. 2006-154720 (2006).

BRIEF SUMMARY OF THE INVENTION

By the way the projection-type image display apparatuses are also widen in the fields of applications thereof, accompanying with an enlargement of the image projected, and in particular, they are often used for the purpose of presenting image information to a large number of human beings, such as, in a class room of a school, or a meeting room of a company, etc., and in such case, there are many situations that the position installing the apparatus should be changed, for example, depending on an arm (i.e., the right-hand or the left-hand) of a presenter holding an indicator stick and the position where she/he is standing.

However, with the projection-type image display apparatuses of the conventional arts mentioned above, because of various kinds of aberrations, such as, a trapezoidal distortion, etc., which are generated in the oblique projection method, accompanying the change of position where that apparatus is installed, for that reason, a large amount of time is necessary to obtain a preferable image, again, and there is pointed out an inferior usability of that apparatus.

Then, according to the present invention, for dissolving a problem in the conventional arts mentioned above, it is an object to provide a projection-type image display apparatus, not generating the trapezoidal distortion and/or the various kinds of aberrations on the display screen, in spite of change of the installation position, and for that reason, for enabling an easy change of the installation position of the apparatus (i.e., increasing a degree of freedom of the installation position), thereby being superior in the usability thereof.

For accomplishing the object mentioned above, according to the present invention, firstly there is provided a projection-type image display apparatus, comprising: an image display element, which is configured to display an image to be projected onto a display portion; a light source unit, which is configured to irradiate light upon said image display element; an enlarged projection optical unit, which is configured to project the lights from said light source unit onto said display portion, enlargedly; and a display controller portion, which is configured to move position of the image displayed on said image display element within a display surface of said element, wherein said enlarged projection optical unit, further comprising: a projection lens, which is configured to project the image of said image display element, enlargedly; a group of lenses, which are disposed on a same optical axis, sequentially from a side of said image display element and include at least one (1) piece of a lens having a freely curved surface; and a reflection mirror having a reflection surface made up with a freely curved surface, which is disposed between said group of lenses and said display portion, wherein said image display element has a display surface larger than said display portion, when a whole body thereof is projected on said display portion, through said enlarged projection optical unit, to be displayed by projection thereof, said display controller portion brings the image on the display surface of said image display element to be movable, within the display surface of said image display element, so as to project a portion fitting to said display portion, selectively, to be displayed, when projecting it through said enlarged projection optical unit upon said display portion, to be displayed, and thereby enabling an installation position of said projection-type image display apparatus to be movable with respect to said display portion.

Also, according to the present invention, within the projection-type image display apparatus, as described in the above, it is preferable that said projection-type image display apparatus is fixed in a vertical direction thereof while movable in a horizontal direction thereof, with respect to said display portion, and further that said image display element has the display surface larger than said display portion in the horizontal direction thereof, when it projects the whole body thereof through said enlarged projection optical unit upon said display portion. In addition thereto, according to the present invention, within the projection-type image display apparatus, as described in the above, it is preferable that said image display element is constructed with a liquid crystal display element of WXGA enable type, while on the other hand, said display portion is a surface of an aspect ration 4:3, and further that a movement mechanism is attached to said apparatus, so as to bring it to be movable in a horizontal direction.

Thus, according to the present invention mentioned above, there can be achieved a superior effect of providing a projection-type image display apparatus, not generating the trapezoidal distortion and/or the various kinds of aberrations on the display screen, in spite of change of the installation position, and for that reason, for enabling an easy change of the installation position of the apparatus, thereby being superior in the usability thereof.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Hereinafter, embodiments according to the present invention will be fully explained by referring to the attached drawings. However, in the explanation given below, the same reference numerals are given to elements, each having common function, and with those that were explained once, the explanation thereof will be omitted, appropriately, for the purpose of avoiding duplication thereof.

However, being applied as a projection-type image display apparatus in the embodiments, which will be shown hereinafter and will be shown the structures thereof, is a display apparatus being able to display a color image, being modulated through a plural number of transmission-type liquid display panels (i.e., three (3) pieces for R, G and B), on a screen as a display portion, for example, without generation of the trapezoidal distortion and/or the various kinds aberrations, with using a lens having a freely-curved surface and also a reflection mirror having a freely-curved surface, as well, as an optic system (i.e., an enlarged projection optic system) for an enlarged projection thereof, as is shown in Japanese Patent Application No. 2006-166434 (U.S. patent application Ser. No. 11/763,465 filed on Jun. 15, 2007: EP Application No. 07252401.0), which was proposed by the same inventors and already filed.

Also, from experiments and trials conducted by the present inventors, variously, with applying the enlarged projection optic system distinctive in such the projection-type image display apparatus, in particular, in case when obtaining an enlarged projection image focusing on the screen, for the purpose of enlarging an angle of field in the vertical direction thereof, it is necessary to satisfy a condition in a projection lens of an oblique projection type for obtaining a sufficiently large image with a short projection distance, i.e., the Shaimple condition, and there is a certain limit. However, on the other hand, it is understood that enlargement of the angle of field in the horizontal direction can be secured up to a sufficient largeness, with relative ease.

Then, according to the present invention, for enabling movement of the installation position of the apparatus and also for increasing the degree of freedom thereof, as will be mentioned in details hereinafter, there is applied the characteristics of the enlarged projection optic system mentioned above. Thus, explaining it in more details thereof, while setting up an original image, which can be obtained without generating the trapezoidal distortion and/or the various kinds of aberrations through that enlarged projection optic system, to be larger than the screen, and then it is so displayed that is can expand in the horizontal direction, in particular, and on the other hand, the image actually displayed on the screen is adjusted on the transmission-type liquid crystal panels, upon surfaces of which the modulated picture of that image are displayed, and thereby displaying it fitting to the size of the screen.

Explanation will be given on the principle for increasing the degree of freedom of installation within the projection-type image display apparatus mentioned heretofore, as a gist of the present invention, by referring to FIGS. 1A, 1B and 2A and 2B, hereinafter.

Figure 1A:
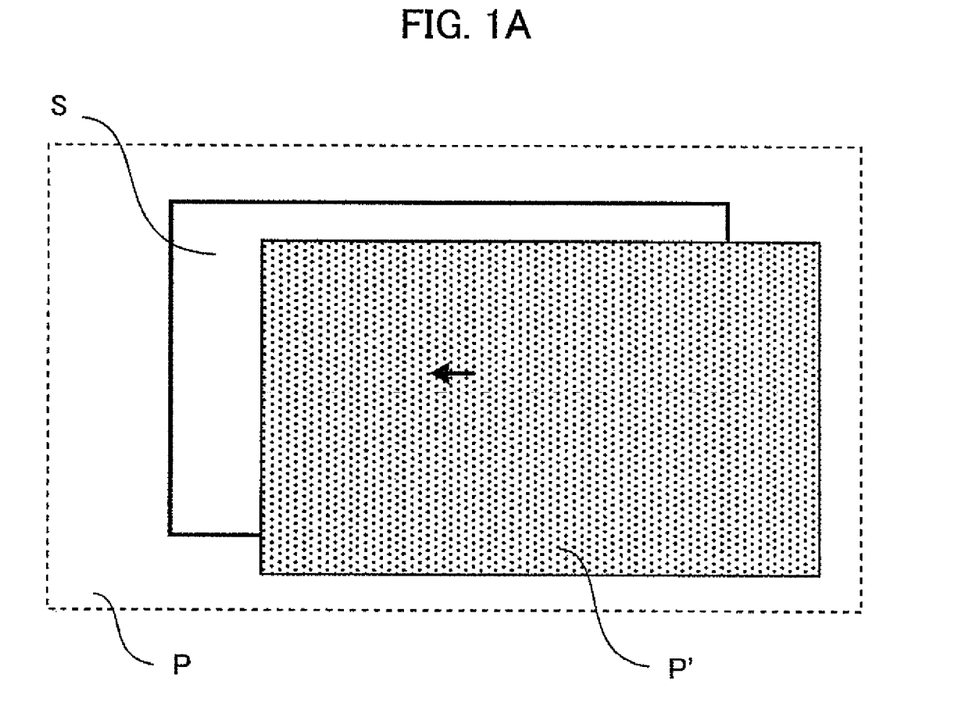
FIGS. 1A and 1B are views for explaining the principle of increasing a degree of freedom of the installation position of a projection-type image display apparatus, according to the present invention.

In FIG. 1A, as well as, a display portion on surface of which an image is projected, i.e., the screen "S", there are illustrated an image, which can be originally displayed by that display apparatus, i.e., an image or picture "P" when displaying it by projecting the image display elements or the transmission-type liquid crystal panels, as a whole (hereinafter, it may be also called, an "original image"), and an image "P'", displayed in a part thereof, which is actually displayed on the screen "S" (hereinafter, it may be also called, an "actual image"). And, according to the present invention, as is apparent from FIG. 1B, on the display screen of the liquid crystal panels, the actual image "P'" is moved within a region of the original image "P", and thereby disposing it to the position fitting to the screen "S", appropriately.

Figure 2A:
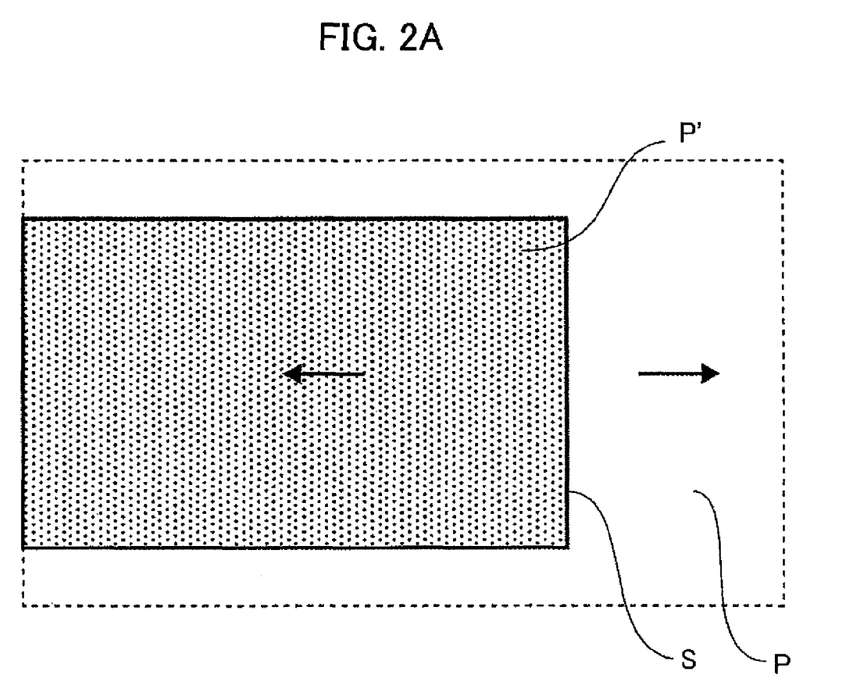
FIGS. 2A and 2B are also views for explaining the principle of increasing a degree of freedom of the installation position of the projection-type image display apparatus, according to the present invention, similar to FIGS. 1A and 1B mentioned above.
Figure 2B:
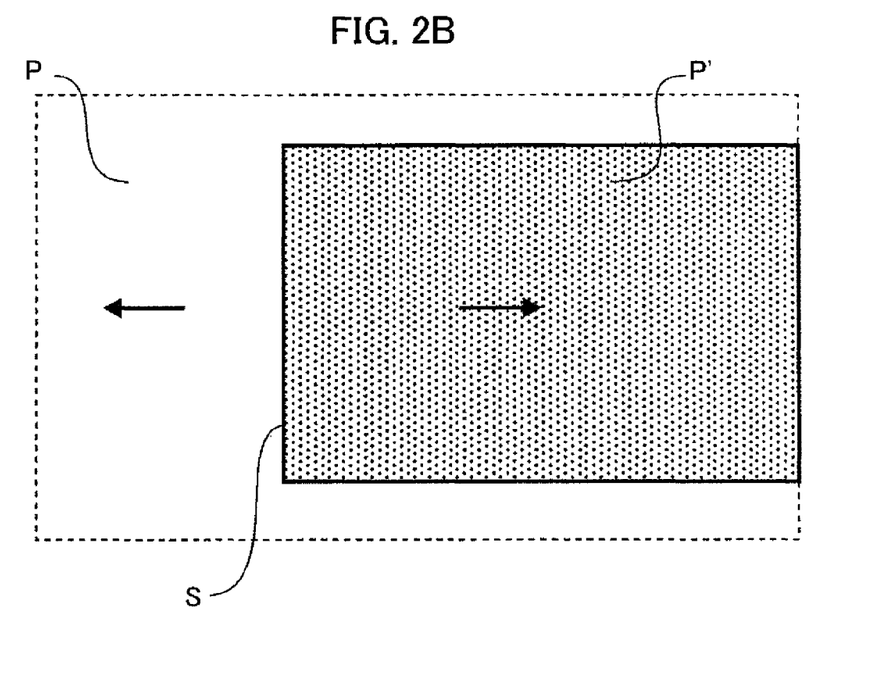

For example, as is shown in FIG. 2A, when the original image "P" displaying the whole of the liquid crystal panels moves into the right-hand side with respect to the screen "S" (please see an arrow in the figure), due to movement of the projection-type image display apparatus in the installation position thereof, then the smaller actual picture "P'" within the region of the original picture "P" is moved to the left-hand side (please see an arrow). On the other hand, as is shown in FIG. 2B, when the original image "P" displaying the whole of the liquid crystal panels moves into the left-hand side with respect to the screen "S" (please see an arrow in the figure), due to movement of the projection-type image display apparatus in the installation position thereof, then the actual picture "P'" is moved to the left-hand side (please see an arrow). With this, also when changing the installation position of the projection-type image display apparatus, in particular, when moving it in the horizontal direction, it is possible to dispose the actual image "P'" to the position fitting to the screen "S", again, with a simple operation, such as, only moving the actual image "P'" on the liquid crystal panels, and thereby enabling to maintain a preferable display condition, without generating the trapezoidal distortion and the various kinds of aberrations on the picture displayed on the screen "S".

Embodiment

Next, explanation will be given on the details of the projection-type image display apparatus, enabling the movement of the installation position of the apparatus, with the principle explained in the above, thus, securing the degree of freedom of the installation position, by referring to FIGS. 3A and 3B and further FIG. 4.

Figures 3A, 3B:
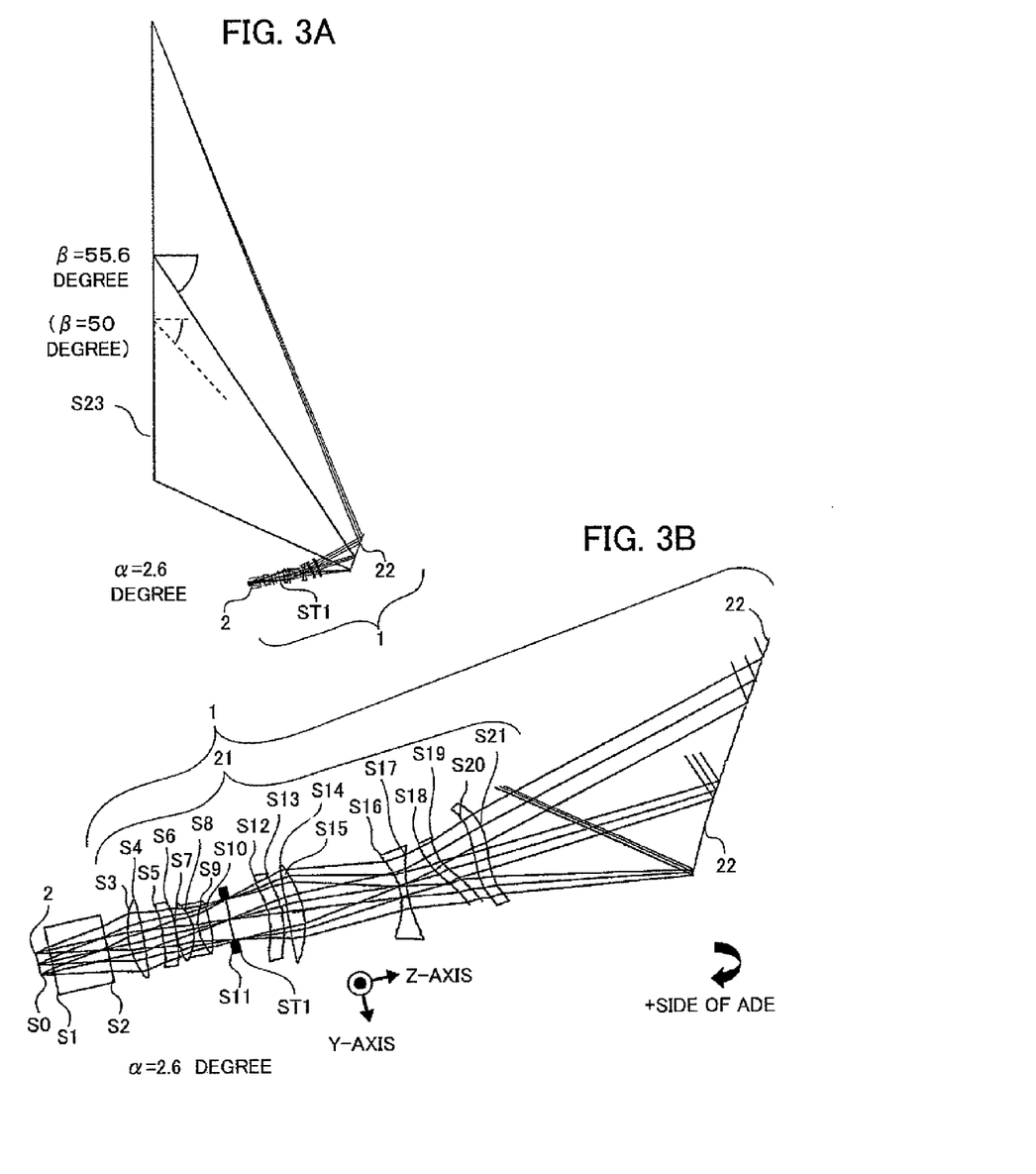
FIGS. 3A and 3B are views for showing the entire structures of an optic system and the detailed structures including lens compositions thereof, within the projection-type image display apparatus, according to an embodiment of the present invention.
Figure 4:
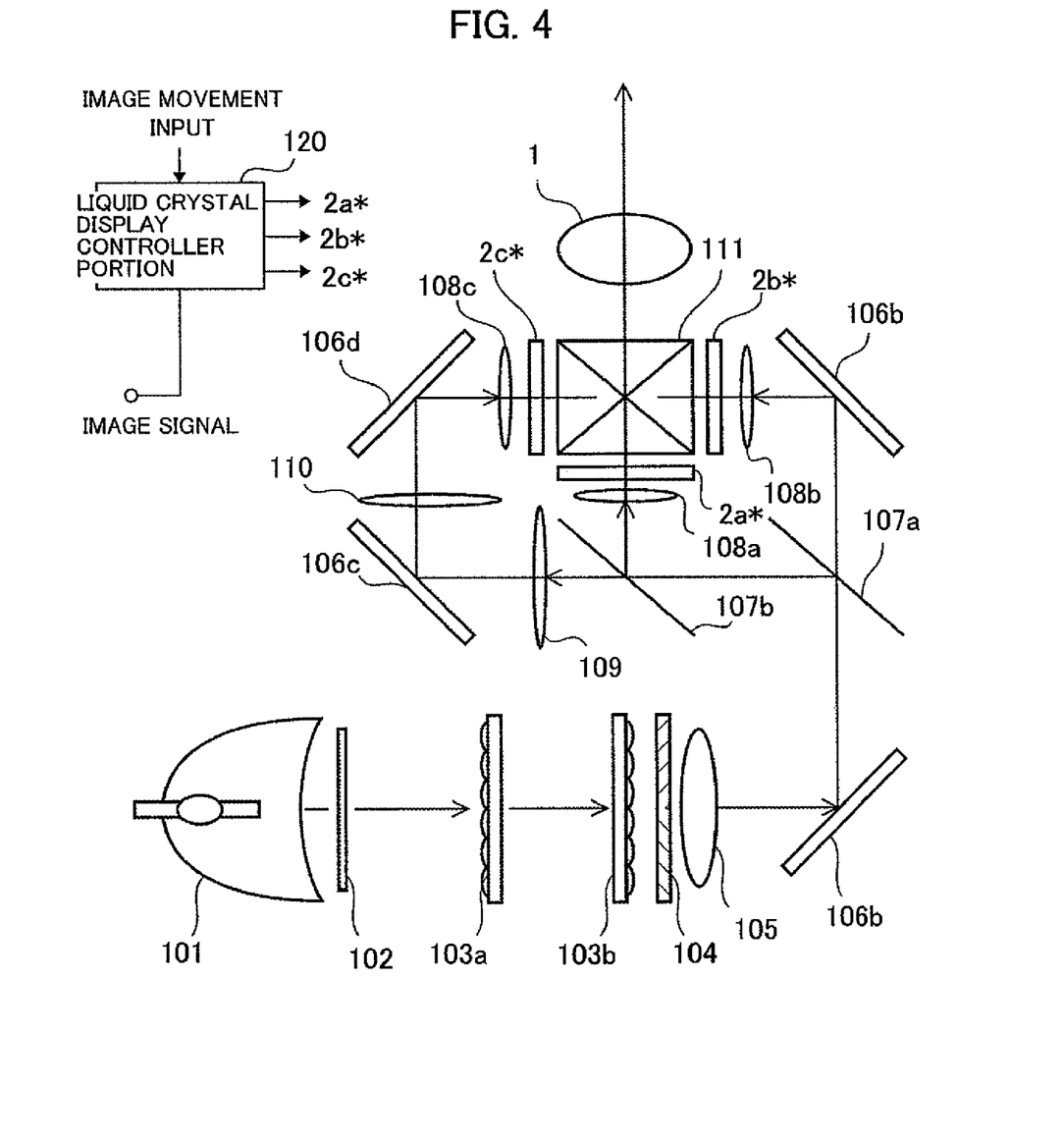
FIG. 4 is a block diagram for showing the entire structures of the projection-type image display apparatus, according to the embodiment of the present invention mentioned above.

First of all, FIGS. 3A and 3B show an example of structures of the enlarged projection optic system, including the projection lens of the oblique projection method, in the present embodiment, and in particular, FIG. 3A of them shows a whole of that, and FIG. 3B shows, in particular, the detailed structures of the projection lens.

As is shown in FIG. 3A, the enlarged projection optic system includes, for example, the image display element 2 made of the above-mentioned transmission-type liquid crystal panel (however, in this figure, only one (1) piece of them is shown), a projection lens 1 as a projection optic system, a screen 3, and a reflection mirror 22 as a return mirror, wherein through this reflection mirror, i.e., the reflection mirror 22, so-called the oblique projection optic system is constructed. However, an optical axis to be use hereinafter means an optical axis in a local coordinates for each lens.

Following to the above, as is shown in FIG. 3B, the projection lens 1 is built up with a refraction lens system 21 made up with a plural number of lenses, and a reflection mirror 22, and that refraction lens system 21 is disposed on a side of the image display element 2, and within an inside of that refraction lens system 21 is provided an eccentric iris, being eccentric with respect to the optical axis thereof.

But, the reflection mirror 22 mentioned above is provided for returning the image light from the image display element 2 to the side of the screen 3, for making the distance between the screen and the apparatus as small as possible, for example, when applying the present embodiment into the projection-type image display apparatus. Of course, this should not be restricted to this. Herein, the reflection mirror 22 is a freely curved surface mirror.

By the way, with such oblique projection system as mentioned above, so-called the trapezoidal distortion is generated. Then, with this trapezoidal distortion, as is disclosed in the Patent Document 2 mentioned above, i.e., the patent publication of the patent application, which is proposed by the same inventors and already filed, the reflection mirror 22 is compensated or corrected with using a capacity of aberration compensating of the freely-curved surface mirror building up the reflection mirror 22. Further, according to the present embodiment, also by means of the freely curved surface lens (will be mentioned later) included in the refraction lens system 21, the compensation is conducted on the trapezoidal distortion. However, with the projection lens that is disclosed in the Patent Document 2 mentioned above, two (2) pieces of the freely curved surface mirrors are applied, each being superior in the capacity of compensating the trapezoidal distortion and the other aberrations, and the oblique projection angle is still small, i.e., 40 degrees, i.e., it does not reach to that the image display elements are disposed to be oblique to the projection lens.

Next, explanation will be give on the detailed numerical embodiment of the projection lens 1 mentioned above, with using tables 1 to 5, which will be given below, as well as, by referring to FIG. 3B, again. The numerical values of the lens data shown in the tables 1 to 5 below are those of an example, where g an image of a region 13.2×9.9 on a material surface is projected onto a largeness of 1,625.6×1,219.2 on an image surface.

Also, the surface numbers of those lenses are shown by references S0 to S23, sequentially, assuming a display surface (i.e., the material surface) of the image display element 2 to S0. In more details, a light incident surface of a cross prism 111 (will be mentioned later) disposed next to the display surface (i.e., the material surface) S0 of the image display element 2 is shown by S1, a light emitting surface thereof S2, a light incident surface of a first lens building up the refraction lens system 21 disposed next to it by S3, and a light emitting surface thereof by S4, a surface of the eccentric iris ST1 by S11, ..., a reflection surface of the reflection mirror 22 by S22, and a surface (i.e., an image surface) of the screen 3 by S23, respectively.

Also, the lens data displays the data of each lens in the local coordinates thereof, sequentially; however for easily understanding of the directions, X-axis, Y-axis and Z-axis, roughly, the local coordinates on an opening iris surface 811 is shown in FIG. 3B.

Following to the above, in the Table 1 given below, "Rd" shows a radius of curvature of each surface, wherein it is indicated by a positive value when a center of curvature lies on the right-hand side of the surface within the figure, or by a negative value when it is reversed. Also, "TH" is the distance between the surfaces, i.e., it indicates the distance from a summit on that lens surface up to the summit on the next coming lens surface. With a certain lens surface, when the next coming lens surface is located on the right-hand side, then the distance between the surfaces is presented by a positive value, when it on the left-hand side, it is presented by a negative value. Further, surfaces S5, S6, S12 and S13 are rotationally symmetrical aspheric surface, and they are shown with attaching "*" beside the surface number, in the Table 1.

TABLE 1

| Surface | Rd | TH | nd | v d |
|---------|-----|------|---------|------|
| S0 | Infinity | 5.977 | | |
| S1 | Infinity | 26.395 | 1.51680 | 64.2 |
| S2 | Infinity | 9.938 | | |
| S3 | 36.40 | 6.700 | 1.84666 | 23.8 |
| S4 | −172.286 | 8.870 | | |
| S5* | 4710.437 | 6.000 | 1.49091 | 58.0 |
| S6* | −1283.473 | 0.100 | | |
| S7 | 35.918 | 8.000 | 1.48749 | 70.4 |
| S8 | −19.759 | 2.500 | 1.84666 | 23.8 |
| S9 | 20.619 | 5.800 | 1.48749 | 70.4 |
| S10 | −48.583 | 9.000 | | |
| S11 | Infinity | 17.160 | | |
| S12* | −38.217 | 6.000 | 1.49091 | 58.0 |
| S13* | −40.281 | 2.360 | | |
| S14 | 1001.620 | 7.200 | 1.80610 | 33.3 |
| S15 | −42.940 | 44.228 | | |
| S16 | −29.908 | 3.500 | 1.48749 | 70.4 |
| S17 | 72.760 | 19.858 | | |
| S18# | Infinity | 6.000 | 1.49091 | 58.0 |
| S19# | Infinity | 6.932 | | |
| S20# | Infinity | 6.000 | 1.49091 | 58.0 |
| S21# | Infinity | 102.031 | | |
| S22# | Infinity | −888.477 | REFL | |
| S23 | Infinity | — | | |

However, the surface configuration of the rotationally symmetrical aspheric surface can be presented by the following equation (Eq. 1), and coefficients on the four (4) aspheric surfaces mentioned above are shown in the following Table 2.

$$Z = \frac{cr^2}{1+\sqrt{1-(1+k)c^2r^2}} + A\cdot r^4 + B\cdot r^6 + C\cdot r^8 + D\cdot r^{10} + E\cdot r^{12} + F\cdot r^{14} + G\cdot r^{16} + H\cdot r^{18} + J\cdot r^{20}$$ (Eq. 1)

(Eq. 2), and in the following are shown the values of the coefficients C(m,n) for each "m", "n", in the Table 3. However, two (2) pieces of the freely curved lenses are for compensating the trapezoidal distortion, which is generated due to the oblique projection, in cooperation with the freely curved mirror of the reflection mirror 22.

TABLE 2

| Surface | | | | Aspheric Surface Coefficients | | | | |
|---|---|---|---|---|---|---|---|---|
| S5  | K | 76267.9963   | C | −4.351E−11 | F | −6.488E−18 | J | −6.107E−26 |
|     | A | −3.65E−05    | D | 4.0368E−13 | G | 2.992E−21  |   |            |
|     | B | −5.477E−09   | E | 1.5886E−18 | H | −4.589E−24 |   |            |
| S6  | K | −78271.536   | C | −1.557E−11 | F | 4.9662E−18 | J | 3.4853E−25 |
|     | A | −3.781E−05   | D | −2.675E−13 | G | −1.676E−20 |   |            |
|     | B | −9.286E−09   | E | −2.14E−17  | H | −9.422E−23 |   |            |
| S12 | K | 0.35333475   | C | 4.6989E−11 | F | 1.2748E−18 | J | 5.3155E−26 |
|     | A | −6.576E−07   | D | −7.849E−14 | G | −4.983E−21 |   |            |
|     | B | 2.5656E−08   | E | 2.3211E−16 | H | −1.857E−23 |   |            |
| S13 | K | 0.05198949   | C | 1.2912E−11 | F | 1.7517E−19 | J | 7.3476E−27 |
|     | A | 1.9971E−06   | D | 1.4302E−14 | G | −1.034E−22 |   |            |
|     | B | 1.6908E−08   | E | −9.82E−19  | H | −4.354E−24 |   |            |

Also, the surfaces from S18 to S21 are the respective refraction surfaces of the freely curved surface lenses, and the surface S22 is a reflection surface of the freely curved surface mirror, being attached with "*" beside the surface number thereof. The configurations of those five (5) pieces of freely curved surfaces can be expressed by the following equation $$Z = \frac{cr^2}{1+\sqrt{1-(1+k)c^2r^2}} + \sum_m \cdot \sum_n (C(m,n)\cdot x^m \cdot y^n)$$ (Eq. 2)

TABLE 3

| Surface | | | | | | | | |
|---|---|---|---|---|---|---|---|---|
| S18 | K      | 0           | C(4.1) | 2.74E−06  | C(2.5) | −9.44E−09 | C(4.5)  | 1.74E−11  |
|     | C(0.1) | 0.77728116  | C(2.3) | 3.86E−06  | C(0.7) | −7.23E−10 | C(2.7)  | 4.61E−12  |
|     | C(2.0) | −0.0237261  | C(0.5) | 3.28E−06  | C(8.0) | 2.78E−10  | C(0.9)  | −9.63E−13 |
|     | C(0.2) | −0.011193   | C(6.0) | −6.21E−08 | C(6.2) | 7.46E−11  | C(10.0) | −2.93E−13 |
|     | C(2.1) | −0.0009319  | C(4.2) | 5.72E−08  | C(4.4) | 2.14E−10  | C(8.2)  | −3.53E−13 |
|     | C(0.3) | −0.0013365  | C(2.4) | −9.29E−08 | C(2.6) | −8.31E−11 | C(6.4)  | −9.12E−14 |
|     | C(4.0) | 8.592E−06   | C(0.6) | 2.16E−08  | C(0.8) | 5.95E−11  | C(4.6)  | 3.04E−13  |
|     | C(2.2) | 7.2254E−05  | C(6.1) | −6.35E−09 | C(8.1) | 4.34E−12  | C(2.8)  | 6.40E−14  |
|     | C(0.4) | 3.3648E−05  | C(4.3) | −3.10E−09 | C(6.3) | 7.31E−12  | C(0.10) | −1.11E−13 |
| S19 | K      | 0           | C(4.1) | 9.64E−07  | C(2.5) | 1.90E−09  | C(4.5)  | 9.12E−12  |
|     | C(0.1) | 0.78854159  | C(2.3) | 2.85E−07  | C(0.7) | 7.20E−10  | C(2.7)  | 1.82E−12  |
|     | C(2.0) | −0.0216438  | C(0.5) | 1.75E−06  | C(8.0) | 1.45E−10  | C(0.9)  | −2.48E−12 |
|     | C(0.2) | −0.012203   | C(6.0) | −4.13E−08 | C(6.2) | 2.25E−10  | C(10.0) | −1.25E−13 |
|     | C(2.1) | −0.0005154  | C(4.2) | −2.39E−08 | C(4.4) | 4.12E−10  | C(8.2)  | −3.19E−13 |
|     | C(0.3) | −0.0010429  | C(2.4) | −1.68E−07 | C(2.6) | 3.16E−10  | C(6.4)  | −1.41E−13 |
|     | C(4.0) | 3.7301E−06  | C(0.6) | −3.52E−08 | C(0.8) | 7.10E−11  | C(4.6)  | 4.54E−14  |
|     | C(2.2) | 7.7564E−05  | C(6.1) | −1.88E−09 | C(8.1) | 3.04E−13  | C(2.8)  | −1.09E−13 |
|     | C(0.4) | 4.9708E−05  | C(4.3) | 3.47E−09  | C(6.3) | 3.70E−12  | C(0.10) | −1.04E−13 |
| S20 | K      | 0           | C(4.1) | −9.35E−07 | C(2.5) | 2.47E−09  | C(4.5)  | −1.19E−12 |
|     | C(0.1) | 0.22293143  | C(2.3) | −1.67E−06 | C(0.7) | −3.56E−10 | C(2.7)  | −7.50E−13 |
|     | C(2.0) | 0.03205384  | C(0.5) | −1.29E−06 | C(8.0) | 2.45E−12  | C(0.9)  | 8.53E−13  |
|     | C(0.2) | 0.01991488  | C(6.0) | 4.12E−09  | C(6.2) | 1.76E−12  | C(10.0) | −1.95E−15 |
|     | C(2.1) | 0.00104417  | C(4.2) | −6.91E−09 | C(4.4) | −5.48E−12 | C(8.2)  | −4.34E−15 |
|     | C(0.3) | 0.0004342   | C(2.4) | 9.00E−09  | C(2.6) | 4.84E−11  | C(6.4)  | −1.07E−14 |
|     | C(4.0) | −1.696E−05  | C(0.6) | −2.31E−08 | C(0.8) | 5.54E−12  | C(4.6)  | −1.34E−14 |
|     | C(2.2) | −1.633E−05  | C(6.1) | 1.63E−10  | C(8.1) | −1.56E−14 | C(2.8)  | −2.64E−14 |
|     | C(0.4) | −2.687E−05  | C(4.3) | 6.15E−10  | C(6.3) | −6.25E−14 | C(0.10) | 1.47E−14  |
| S21 | K      | 0           | C(4.1) | −1.36E−06 | C(2.5) | 2.59E−09  | C(4.5)  | −9.87E−13 |
|     | C(0.1) | 0.21505056  | C(2.3) | −2.06E−06 | C(0.7) | 1.96E−10  | C(2.7)  | −6.75E−13 |
|     | C(2.0) | 0.03681255  | C(0.5) | −1.28E−06 | C(8.0) | 2.06E−12  | C(0.9)  | 4.03E−13  |
|     | C(0.2) | 0.02059904  | C(6.0) | 7.16E−09  | C(6.2) | 4.46E−12  | C(10.0) | −2.22E−15 |
|     | C(2.1) | 0.00115712  | C(4.2) | −4.08E−09 | C(4.4) | 1.52E−11  | C(8.2)  | −3.08E−15 |
|     | C(0.3) | 0.00031471  | C(2.4) | 8.85E−09  | C(2.6) | 4.61E−11  | C(6.4)  | −1.23E−14 |
|     | C(4.0) | −2.255E−05  | C(0.6) | −1.31E−08 | C(0.8) | 1.13E−11  | C(4.6)  | −1.38E−14 |
|     | C(2.2) | −2.824E−05  | C(6.1) | 5.16E−10  | C(8.1) | −1.24E−13 | C(2.8)  | −2.08E−14 |
|     | C(0.4) | −3.402E−05  | C(4.3) | 1.32E−09  | C(6.3) | −1.52E−13 | C(0.10) | 4.81E−15  |
| S22 | K      | 0           | C(4.1) | −9.57E−09 | C(2.5) | −9.95E−13 | C(4.5)  | −3.43E−17 |
|     | C(0.1) | −0.0417768  | C(2.3) | 6.23E−09  | C(0.7) | 3.38E−13  | C(2.7)  | −2.20E−16 |
|     | C(2.0) | 0.00360484  | C(0.5) | 2.84E−09  | C(8.0) | −2.59E−15 | C(0.9)  | 9.64E−17  |

TABLE 3-continued

| Surface | Freely Curved Surface Coefficients | | | | | |
|---|---|---|---|---|---|---|
| C(0.2) | 0.00061986 | C(6.0) | 2.61E−11 | C(6.2) | 3.13E−14 | C(10.0) | 2.90E−20 |
| C(2.1) | 5.9071E−05 | C(4.2) | −2.00E−10 | C(4.4) | −9.77E−15 | C(8.2) | −4.97E−19 |
| C(0.3) | 1.6888E−05 | C(2.4) | 2.64E−12 | C(2.6) | −2.15E−14 | C(6.4) | 2.04E−18 |
| C(4.0) | −2.322E−07 | C(0.6) | 2.00E−11 | C(0.8) | 8.14E−15 | C(4.6) | −2.90E−19 |
| C(2.2) | 7.5974E−07 | C(6.1) | 1.25E−12 | C(8.1) | −6.62E−17 | C(2.8) | −8.62E−19 |
| C(0.4) | 2.7513E−07 | C(4.3) | −2.09E−12 | C(6.3) | 4.00E−16 | C(0.10) | 4.21E−19 |

However, in the Table 3 given above, a title and a value of the coefficient are aligned left to right by a set of framework, wherein the right-hand side is the value, the left-hand side indicates the title, and two (2) sets of numerical values divided by comma in a bracket indicate the values of "m" and "n" shown in the equation (Eq. 2).

Following to the above, the condition of inclination or eccentricity of the local coordinates on each surface is shown in the following Table 4, in the present embodiment. However, herein, the inclination of the surface is presented by an inclination angle with respect to a main surface of the lens before, and the eccentricity is presented by an eccentric amount with respect to the optical axis of the lens before. In this Table 4, "ADE" is amplitude of the inclination within the surface parallel with the cross-section in the figure, and direction of the inclination is positive rotating in the clockwise direction within the cross-section of FIG. 3B, with a unit of degree. Also, "YDE" is amplitude of the eccentricity, and the eccentricity is set up in the direction perpendicular to the optical axis within the cross-section of the figure, wherein the eccentricity to a lower side is positive in the cross-section shown in FIG. 3B, with a unit of degree. However, herein, the lens data are displayed, sequentially, upon basis of each of the local coordinates, however the local coordinates on the opening iris surface S11 is shown in FIG. 3B, representatively, for easy understanding of the X-axis, Y-axis and Z-axis, roughly.

TABLE 4

| Surface | ADE(°) | YDE(mm) |
|---|---|---|
| S3 | 2.602 | −1.289 |
| S22 | 26.495 | −17.365 |
| S23 | −50.000 | 0.000 |

In the inclinations and the eccentricities shown in the Table 4 given above, the surface S3 defines an eccentricity/falling amount thereof upon basis of the surface S2, and in the similar manner, the surface S22 defines the eccentricity/falling amount thereof upon basis of the surface S21.

By the way, in case where the lens surface is a transparent surface, it is possible to build up an optic system by defining the eccentricity/falling amounts, sequentially, upon basis of the lens surface before. However, in case where the lens surface is the reflection surface, if inclining the reflection surface by θ degree, then a ray of light (i.e., the next optical axis) is inclined by 2θ degree. Moreover, since the surface S22 is the freely curved surface mirror, which can have an inclination on the surface thereof even on the optical axis, and further thereto, since the eccentricity amount thereof is already determined, a shift is generated between the local optical shaft, which is determined after the surface S22 and the actual ray of light. Then, a dummy surface (not shown in the figure) defining the local optical axis after reflection upon the surface S22 is set at the position of the surface S22 inclining by +59.8 degrees upon basis of the surface S21. This angle is shifted from 52.99 degrees, two (2) times large as the inclination of the surface S22, 26.49 degrees; however, this reason is, as was explained in the above, due to an influence of the freely curved surface mirror, which is eccentric.

Figure 1B:
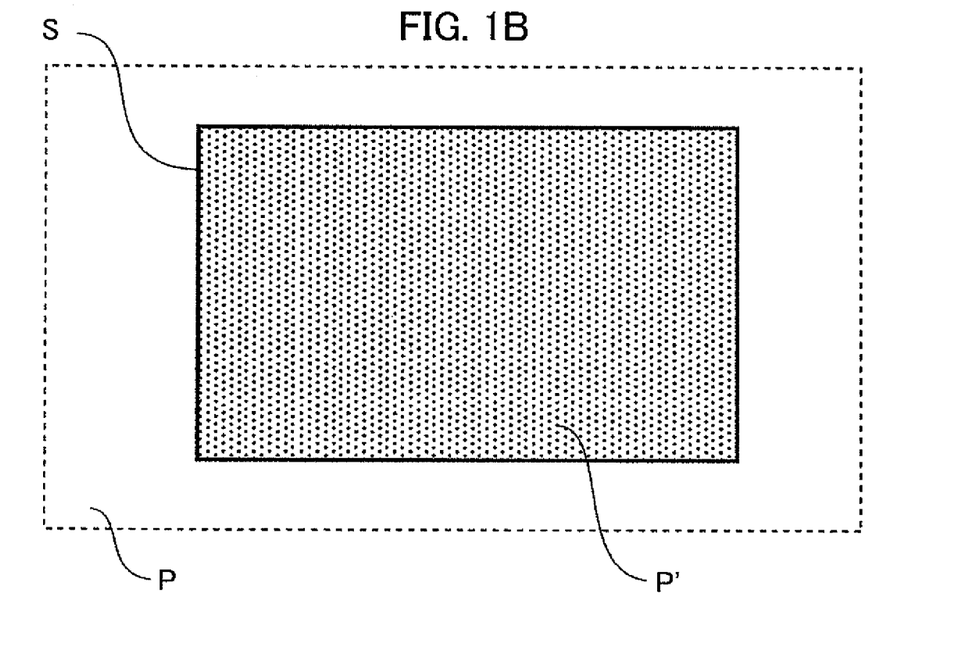

And, the surface S23 (the screen surface) is disposed to incline by −50 degrees with respect to the optical axis of this dummy surface. However, also upon the surface S23 (the screen surface), there is a difference between the positions of the optical axis and the actual ray of light, and this results into an inclination of −55.6 degrees, with respect to the projection axis of the projection lens, which was defined previously, as is shown in FIGS. 1A and 1B.

Further, the following Table 5 shows changes of the distance between the moving lens surfaces, for the lenses moving responding to change of the projection distance. The values in the columns corresponding to "Sc1", "Sc2" and "Sc3" on the Table 3 indicate lens intervals between corresponding to the screen positions, at which the screen size comes to 80 inches, 100 inches and 60 inches, respectively.

TABLE 5

| | TH | | |
|---|---|---|---|
| Surface | Sc1 | Sc2 | Sc3 |
| S15 | 44.228 | 44.192 | 44.300 |
| S17 | 19.858 | 19.525 | 20.401 |
| S19 | 6.932 | 6.192 | 8.083 |
| S21 | 102.031 | 102.771 | 100.880 |
| S22 | −888.477 | −1124.755 | −652.884 |

In FIG. 3B mentioned above, the eccentric iris "ST1" is disposed in the refraction lens system 21 of the projection lens 1, being eccentric by 1.75 mm, shifting into left-upper direction a little bit, with respect to the optical axis of the refraction lens system 21.

Following to the above, explanation will be given on the entire structures of the projection-type image display apparatus, by referring to FIG. 4 attached herewith. However, in this FIG. 4, a light flux emitting from a light source unit 101, being cut off the ultraviolet components thereof by means of an UV cut filter 102, is incident upon a pair of multi-lens arrays 103a and 103b, as an integrator. However, in general, the cut-off of the ultraviolet rays, including the cut-ff of the infrared lays, as well, may be also conducted by other optical element(s), but the detailed description thereof will be omitted, since it is not the gist of the present invention.

In the multi-lens arrays 103a and 103b are disposed convex lenses (or, cells) in a two (2) dimensional manner, and a flux of light incident upon the multi-lens array 103a forms a light source image on each cell of the multi-lens array 103b, in the two (2) dimensional manner. With the respective light source images, each focusing respectively, natural lights thereof is converted into a linear polarized light having vibration in a certain direction, by means of a light converter element 104. This is because, the image display elements 2a, 2b and 2c, which will be mentioned later, allow only the linear polarized light having vibration in the certain direction to pass through.

The light source images, which are divided in the two (2) dimensional manner by the multi-lens arrays 103a and 103b, are overlaid on the image display surfaces of the image display elements 2a, 2b and 2c, by an overlay lens 105 having an overlaying function. However, they are dissolved into three (3) colors, red, green and blue, through a color dissolving optic system lying between the overlay lens 105 and the image display elements 2a, 2b and 2c.

Next, with the flux of lights, passing through the overlay lens 105 and being deflected with an optical path thereof by a total reflection mirror 106a, first of all, by means of a first dichroic mirror 107a, a flux of blue color light passes therethrough, while the red color and the green color lights are reflected thereupon. The flux of blue color light, being deflected upon a total reflection mirror 106b, is irradiated upon the image display element 2b for use of blue color light through a condenser lens 108b. With the red color and the green color lights, by means of a second dichroic mirror 107b, the flux of green color light is reflected thereupon, while the red color light passes therethrough. The flux of red color light is deflected upon total reflection mirrors 106c and 106d, to be irradiated on the image display element 2c for use of the red color light passing through a condenser lens 108c. However, since the optical path of the red color light is long in the length thereof than those of the blue color light and the green color light, it is mapped with using relay lenses 109 and 110.

It is so constructed that each light flux, irradiating upon the image display element 2b for the blue color light and the image display element 2a for the green color light, is color composed or synthesized by the cross prism 111, to be incident upon the projection lens 1. And, as an example of those image display elements can be considered, in particular, liquid crystal panels of transmission type (a type of WXGA enable) of wide width (an aspect ratio=16:9) to be applied therein, preferably.

Figure 5A:
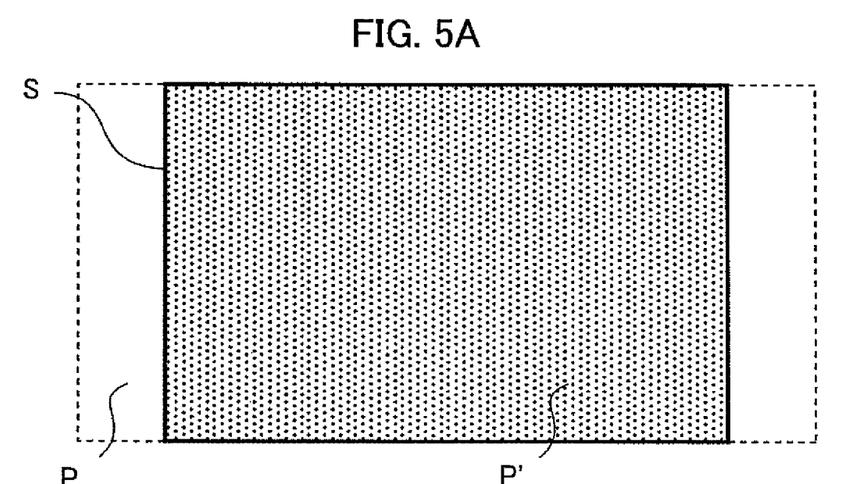
FIGS. 5A to 5C are views for explaining a relationship between an image display element and a screen, upon a surface of which the image is projected, within the projection-type image display apparatus mentioned above.
Figure 5B:
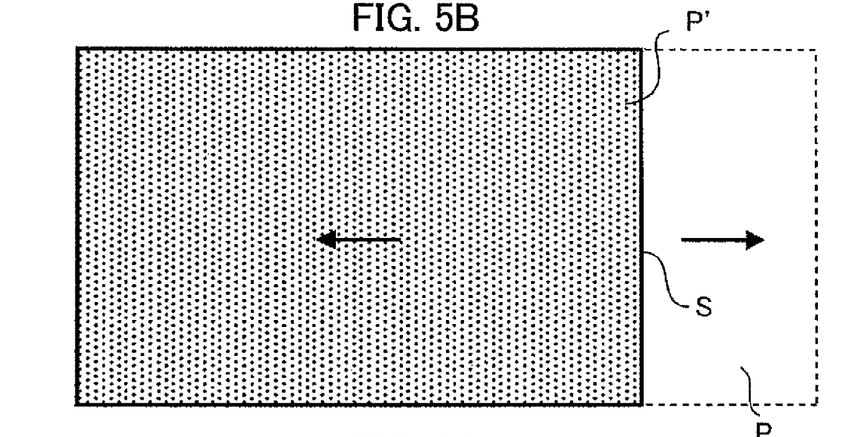
Figure 5C:
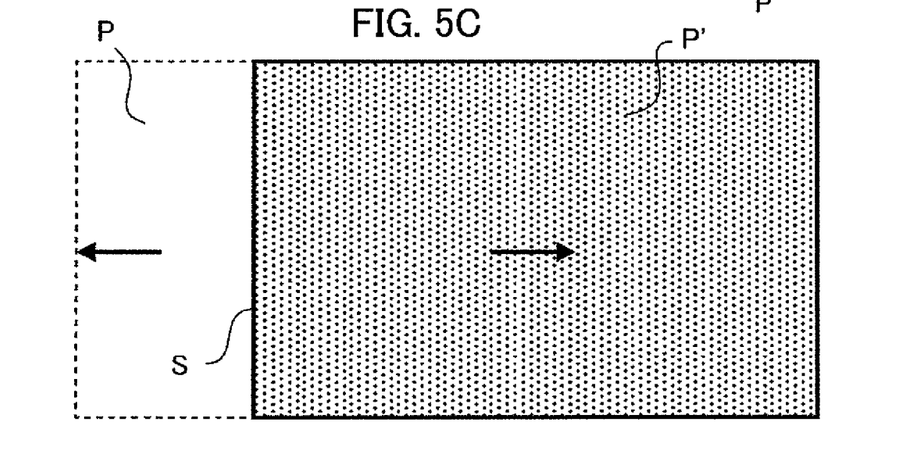

And, for example, as is shown in FIGS. 5A to 5C attached herewith, the image or picture having the aspect ratio 4:3 (i.e., the actual image) "P" is projected, which is widely used, in general, within the range of the image (i.e., the original picture) "P'", which can be obtained by this wide liquid crystal panel (however, the sizes are coincided in the vertical direction of both). With this fact, since the actual image "P" can be moved in the horizontal direction, freely, within the region of the original image "P'" of wide width (the aspect ratio 16:9), it is possible to easily achieve movement/adjustment of the installation position of the projection-type image display apparatus in the horizontal direction, without accompanying the trapezoidal distortion and/or various kinds of aberrations caused due to change of the installation position.

Further, display of the actual image "P" within the image display surface of such the wide width liquid crystal panel (i.e., the original image "P'") (in other words, display controls of three (3) pieces of image display elements 2a, 2b and 2c for use of R, G and B) is conducted, for example, by so-called a liquid crystal controller portion 120, which is constructed with an control element for forming an image on the liquid crystal panel upon basis of the image signal inputted from an outside of the apparatus. Also, movement of the image after changing the installation position of the apparatus (i.e., the actual image) "P" is executed in accordance with an input for image movement, which is inputted by an operator through a key for use of movement, such as, scroll keys or the like, for example, which is provided in a remote controller, in a part or a separated from that apparatus. Or, alternatively, a sensor for detecting the position of the screen 3 is provided in a part of the projection-type image display apparatus, so that the apparatus itself conducts the display control mentioned above, automatically, upon basis of an output of detection of that sensor.

However, though it is omitted in the explanation given in the above, there is disposed a polarizing plate, for cutting off the light rays other than a predetermined polarized light ray, or a phase difference plate, for controlling the vibration direction of the polarized light ray for each color. However, since such the structure does not constitute the gist of the present invention, the detailed explanation thereof will be omitted.

Further, explanation will be given, hereinafter, upon the projection-type image display apparatus, the internal details of which are given heretofore, including more detailed form of application thereof, by referring to FIGS. 6A and 6B and FIG. 7.

Figure 6A:
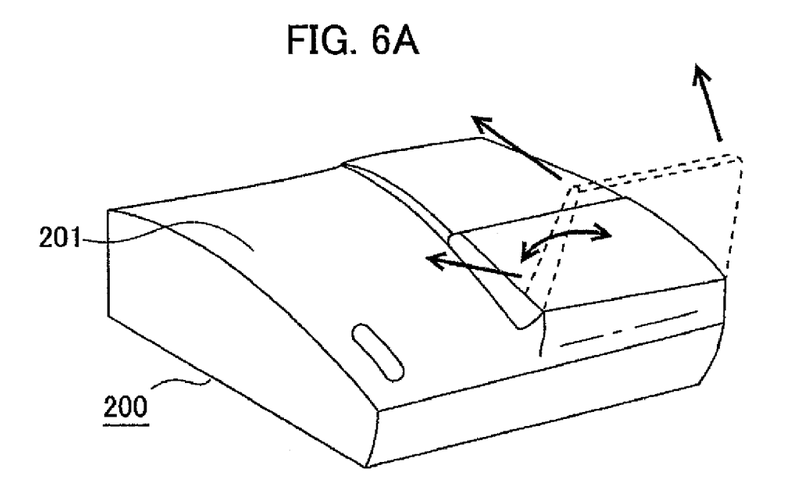
FIGS. 6A and 6B are views for showing an external configuration and for explaining an example of a form of use of the projection-type image display apparatus mentioned above.
Figure 6B:
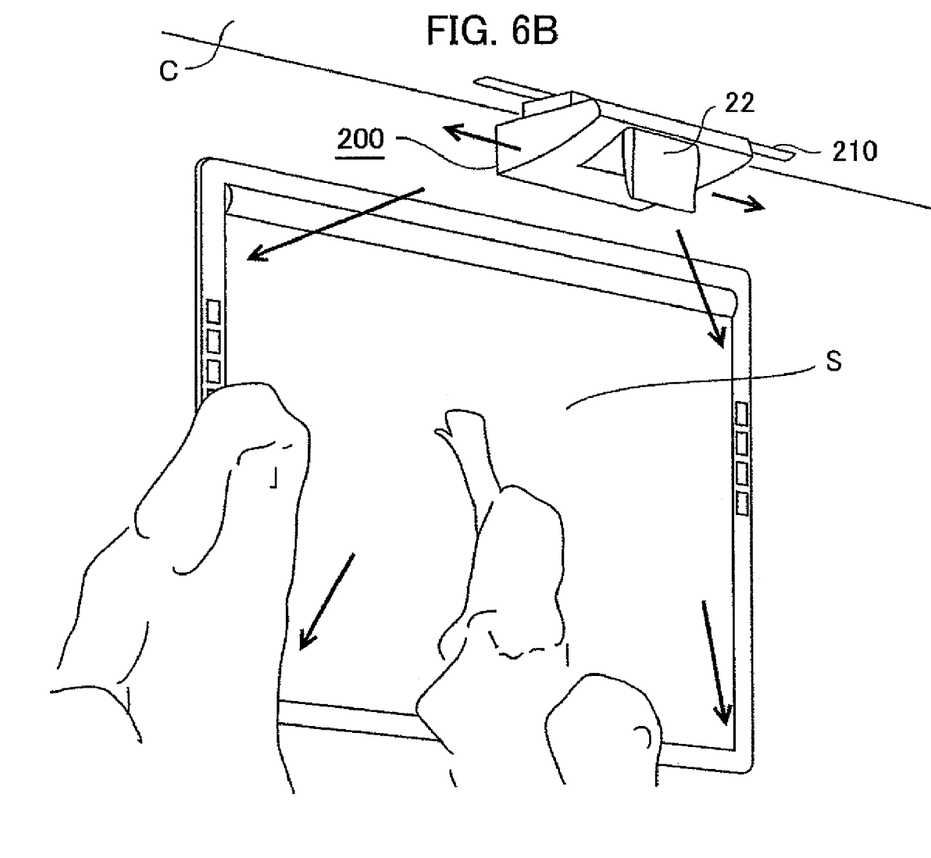

First of all, FIG. 6A shows an outlook of the projection-type image display apparatus 200 mentioned above, wherein the above-mentioned reflection mirror 22 is attached in a part of a main body housing 201 having a roughly box-like shape, so that it can be stored therein by rotating (see an arrow in the figure). Also, FIG. 6B shows a form of application wherein that apparatus 200 installed to be movable on a ceiling surface "C" of a class room, for example, turning it upside-down, and an image or picture thereof is projected on a whiteboard or an instructive board. However, in the figure, a reference numeral 210 is a movement mechanism for brining the apparatus to be slidable, such as, a rail or a guide, etc., for example. Below this movement mechanism 210 is fixed that apparatus with turning it upside-down, and therefore the projection-type image display apparatus 200 mentioned above is slidable in the direction of an arrow. However, herein, the instructive board is that for enabling an operation of an application on the board surface, while projecting a screen of a personal computer on the board, and further for enabling take-in of characters and/or figures written on the board. With this, the position of the apparatus can be changed, appropriately, depending on the standing position of a teacher or a pupil.

Figure 7:
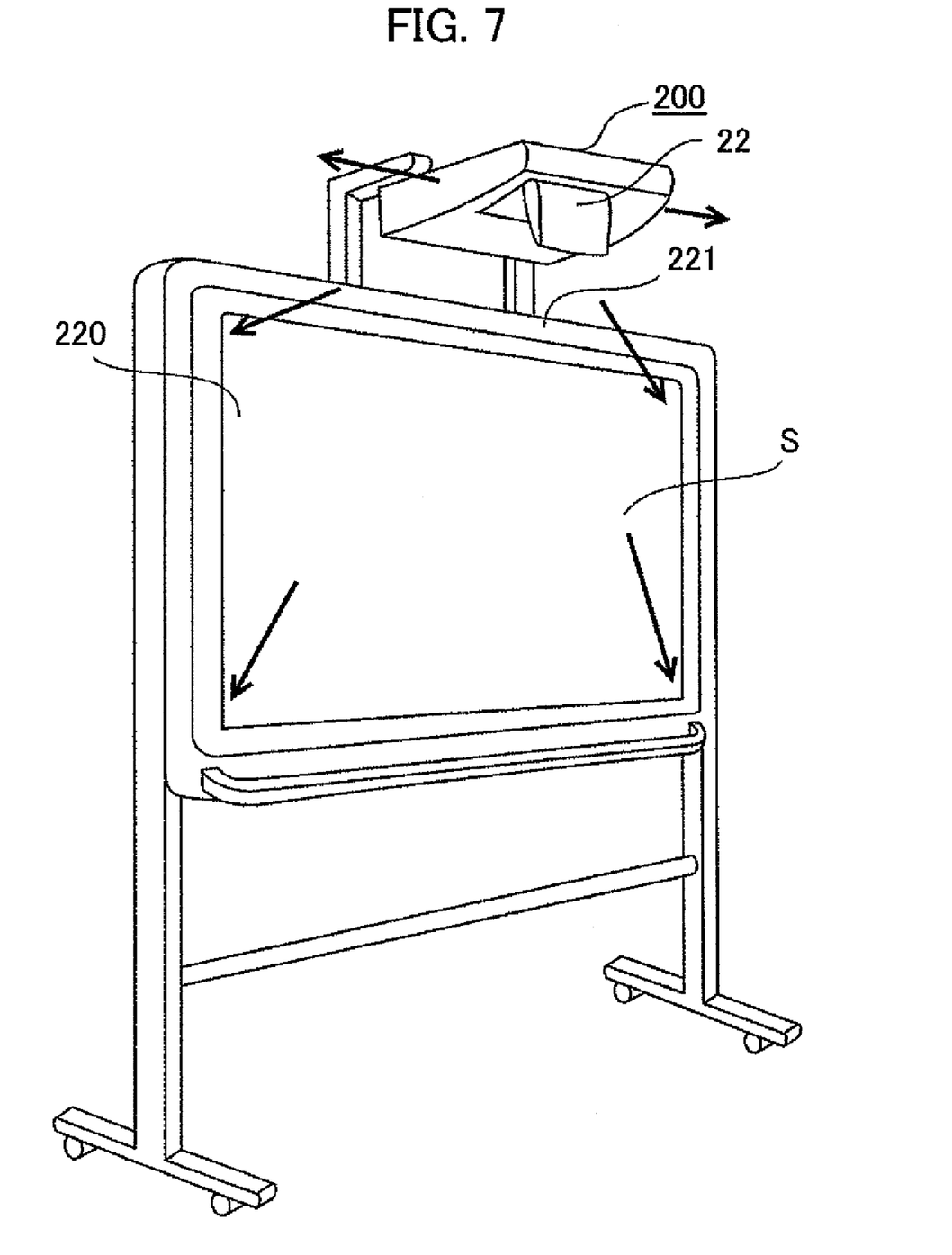
FIG. 7 is a view for explaining other form of user of the projection-type image display apparatus mentioned above.

Further, FIG. 7 attached herewith shows the projection-type image display apparatus, also being unified with the whiteboard or the instructive board, in the structures thereof, thereby building up a projection-type image display system for projecting a large screen on a surface 221(S) of that whiteboard 220. However, in this case, it is preferable that the projection-type image display apparatus 200 is attached in a part of a frame body of that whiteboard 220, in particular, around a central portion of an upper-side frame 222 thereof, also via such the mechanism as was mentioned above (in this example, not shown in the figure, but attaching the movement mechanism on the upper-side frame 221, in advance, the apparatus 200 is fixed on this with using fixing tools of "L" shape), and thereby brining that apparatus 200 to be movable in the horizontal direction with respect to the surface 221 of the whiteboard 220. With this, in the similar manner to that of the form of application mentioned above, it is possible to change the installation position of the projector apparatus, appropriately, depending on the standing position of a presenter, etc., and thereby enabling superior display images, without interruption of the projection image.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection-type image display apparatus, comprising:
an image display element which is configured to display an image to be projected onto a display portion;
a light source unit which is configured to irradiate light upon the image display element;
an enlarging projection optical unit, which is configured to enlargedly project the lights from the light source unit onto the display portion, enlargedly; and
a display controller portion which is configured to move a position of the image displayed on the image display element within a display surface of the image display element,
wherein the enlarging projection optical unit, includes:
a projection lens which is configured to enlargedly project the image of the image display element;
a group of lenses which are disposed on a same optical axis, sequentially arranged from a side of the image display element and which include at least one lens having a lens surface; and
a reflection mirror having a reflection surface which is disposed between the group of lenses and the display portion;
wherein the image display element has a display surface larger than a display surface of the display portion, when an entirety of the image display element is enlargedly projected on the display portion through the enlarging projection optical unit; and
wherein the display controller portion enables movement of the image on the display surface of the image display element, within the display surface of the image display element so as to selectively project a portion fitting to the display portion on the display portion when projected through the enlarging projection optical unit and thereby enabling an installation position of said projection-type image display apparatus to be movable with respect to the display portion.

2. The projection-type image display apparatus, as described in the claim 1, wherein the projection-type image display apparatus is fixed in one direction, while being movable in an other direction perpendicular to the one direction with respect to the display portion.

3. The projection-type image display apparatus, as described in the claim 2, wherein the image display element has the display surface which is larger than the surface of the display portion in the other direction thereof when the entirety of the image display element is enlargedly projected through the enlarging projection optical unit upon the display portion.

4. The projection-type image display apparatus, as described in the claim 3, wherein the image display element is constructed with a liquid crystal display element of wide-aspect ratio, the display portion has a surface with an aspect ratio of 4:3.

5. The projection-type image display apparatus, as described in the claim 2, wherein a movement mechanism is attached to the apparatus so as to enable movement in a horizontal direction.

6. The projection-type image display apparatus, as described in claim 1, wherein the group of lenses are made of plastic.

7. The projection-type image display apparatus, as described in claim 1, wherein the reflection mirror is made of plastic.

* * * * *